Oct. 8, 1968  H. C. ALLEN  3,404,608
TUBE COATING APPARATUS
Filed July 2, 1965
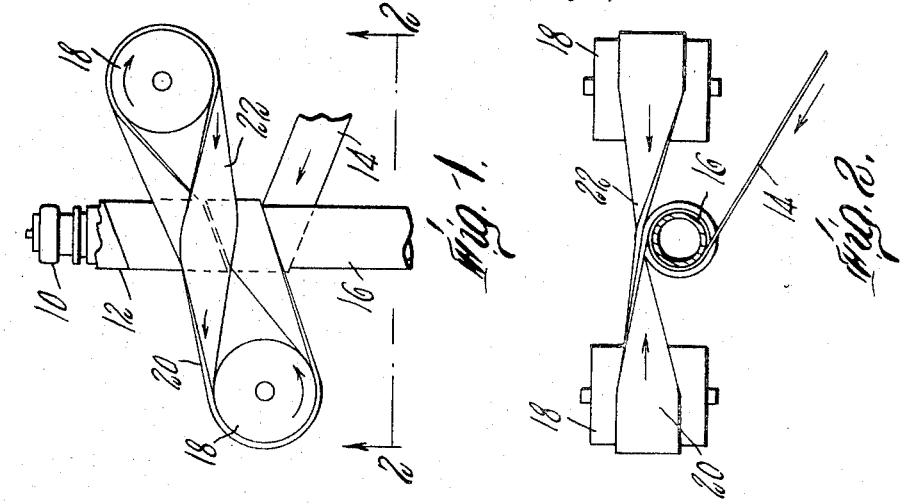
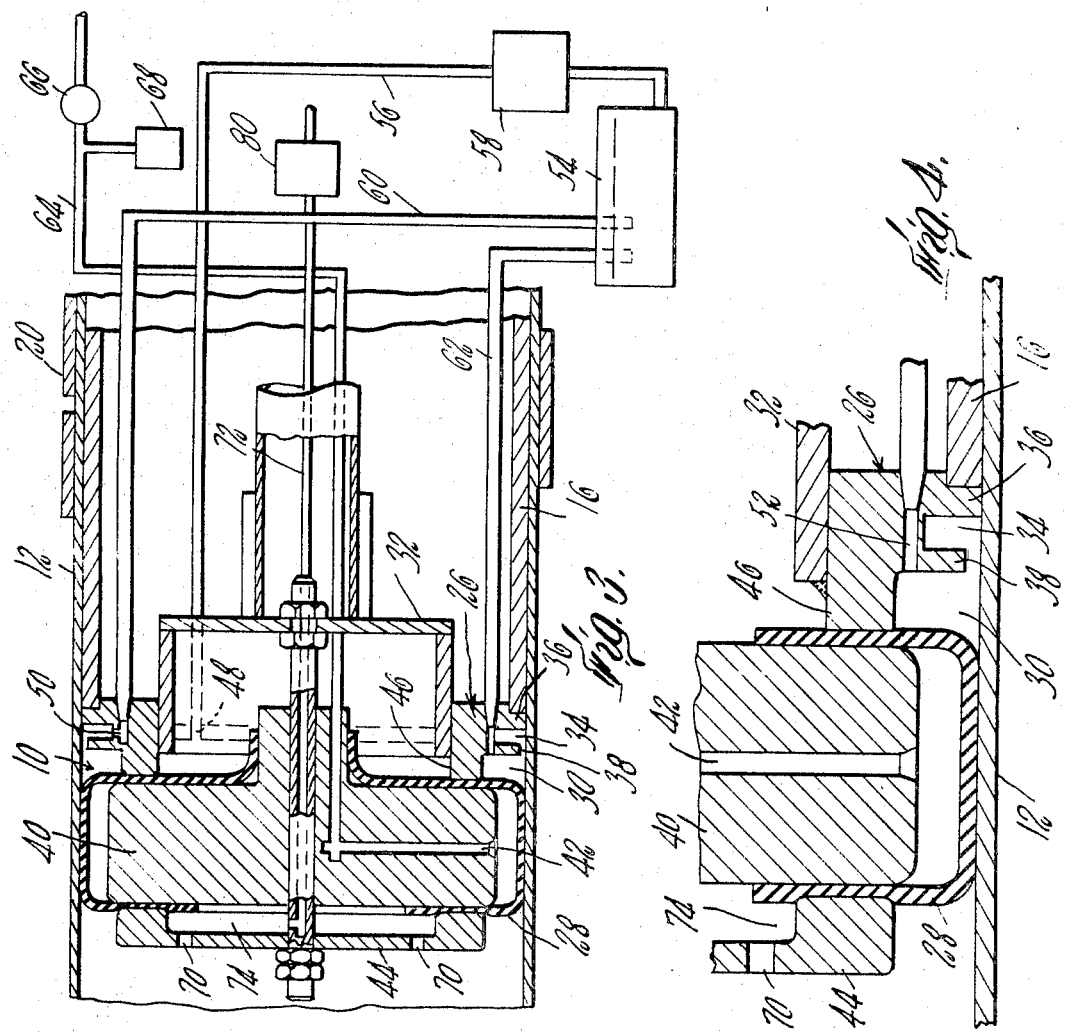

United States Patent Office 3,404,608
Patented Oct. 8, 1968

3,404,608
TUBE COATING APPARATUS
Herman C. Allen, Medfield, Mass., assignor to Bird & Son inc., East Walpole, Mass., a corporation of Massachusetts
Filed July 2, 1965, Ser. No. 469,293
3 Claims. (Cl. 93—80)

ABSTRACT OF THE DISCLOSURE

Tube forming apparatus for wrapping strip-sheet material about an arbor continuously to form a tube of said material and comprising doctor means including an inflatable doctor element spaced beyond the free end of the arbor forming a reservoir between the free end the doctor means, coating material supply means, and a coating supply conduit extending through the arbor from said coating material supply means to the reservoir, the doctor means wiping the interior surface of the tube as the tube passes therebeyond providing a uniform coating on the interior surface of the formed tube and the apparatus including means for varying the internal pressure of the doctor element to control the thickness of the uniform coating.

---

This invention relates to coating apparatus and more particularly, to apparatus for coating the inside of wrapped paper or other tubing with a coating material.

It is a primary object of the present invention to provide novel apparatus for coating the inside of a paper tube with a preselected material to permit the coated tube to be used, for example, as an inexpensive, paper "tin can." Other objects include providing means for use in combination with apparatus for forming paper tubing by continuously wrapping paper stripping about a stationary arbor for coating the inside of a paper tube with any desired thickness of a coating material and providing apparatus of the type mentioned which includes means for controlling the thickness of the coating by varying the diameter of the wiper or doctor element and means for continuously recirculating and filtering the coating material and for drying the coating layer immediately after it is applied.

Generally speaking the invention utilizes an inflatable cylindrical wiper or doctor element mounted coaxially with the stationary arbor of the tube forming means and spaced beyond the free end thereof to form a reservoir intermediate the free end and the doctor, and a coating supply conduit extending through the arbor from a coating material supply to the reservoir to maintain a supply of coating material within the reservoir in contact with the interior surface of the formed tube surrounding the reservoir. The doctor wipes the interior surface of the tube as the tube passes therebeyond to smooth and control the thickness of the coating, providing a uniform coating on the interior surface of the formed tube. In preferred embodiments there is featured a circumferentially grooved applicator ring mounted on the free end of the stationary arbor and means for forcing the coating material under pressure into the circumferential groove, means for varying the internal pressure and diameter of the cylindrical doctor to change the thickness of the coating, means for continuously recirculating and filtering the coating material to remove any lumps, fibers or other impurities from the material before it comes into contact with the paper tube, and means for drying the coating after it is applied.

Other objects, advantages and features will appear from the following description of a preferred embodiment of the invention, taken together with the accompanying drawings, in which:

FIGS. 1 and 2 are views of typical tube forming apparatus which includes tube coating means embodying a preferred form of the present invention; and FIGS. 3 and 4 are plan, sectional views, illustrating the tube coating means of FIG. 1 in greater detail.

Reference is now made to FIG. 1 which illustrates novel means, generally designated 10, for coating the interior peripheral surface of a paper tube 12 with a coating material, such as an organic plastic, immediately after the tube is formed by wrapping paper stripping 14 in a helical configuration about a stationary tube-forming arbor 16. The coating means is mounted coaxially with and on the free end of arbor 16 forming, in effect, an extension of the arbor. Shown in FIGS. 1 and 2, are conventional means for wrapping the paper stripping 14 into a tube 12 and comprise, in addition to the smooth, tube forming arbor 16, a pair of spindles 18 spaced on opposite sides of arbor 16 with their axes perpendicular to the axis of arbor 16, a continuous belt 20 entrained about the arbor and spindles, and means (not shown) for driving at least one of the spindles in rotation. The belt is wrapped about the arbor at an angle (to the axis of the arbor) equal to the angle at which the tube is to be helically wrapped. The paper stripping is fed between belt 20 and arbor 16 at this same angle and is spirally wrapped about the arbor in spaced, abutting, or overlapping helical convolutions or configuration by the moving belt. One or several overlying layers of paper may be similarly applied to provide a multilayer tube, it being appreciated that each such added layer is applied so as to "break joints" with its underlying layer. As the tube 12 is formed from stripping 14, it rotates and moves axially along the arbor, away from the belt and spindles and over coating means 10. A slight clearance is provided between the "return" portion of the belt, designated 22, and the wrapped tube to insure that this axial motion is not impeded.

As illustrated more clearly in FIGS. 3 and 4, coating means 10 comprises a circumferentially grooved applicator ring 26, an adjustable, inflatable cylindrical wiper or doctor element 28 slightly spaced from said ring on the side thereof most distant from arbor 16 to form a reservoir 30 intermediate ring 26 and doctor 28, means for supplying and recirculating the coating material, and means for drying the coating material after it is applied to the tube. The entire coating means is secured to a mounting member, generally designated 32, within arbor 16.

Applicator ring 26 includes a circumferential groove 34 defined by a pair of axially spaced, radially-extending, circumferential flanges 36 and 38. Flange 36, one axial end of which engages adjacent the free end of arbor 16, has a diameter substantially equal to the inside diameter of tube 12. Flange 38 on the other side of groove 34, has a slightly smaller diameter in order to provide a clearance between the flange and the inside of the tube. The amount of clearance, which should be slightly more than the desired final thickness of the coating, depends primarily on the viscosity of the particular material used in the coating process. Typcially, the clearance will be approximately 0.005 in.

The toroidal doctor element 28 is mounted on a hub 40 which is secured to mounting member 32 and includes air lines 42 for providing air under pressure to inflate the doctor to the desired size and pressure. The opposite axial ends of the doctor are pressed tightly against the adjacent ends of the hub by a flanged facing plate 44 and a cylindrical, upstanding axially-extending flange 46 on ring 16 thereby providing the required substantially air-tight seal. As more clearly shown in FIG. 4, flange 46 forms the base of reservoir 30, the sides of which are formed by the adjacent surfaces of doctor 28 and ring 26.

As shown in FIGS. 3 and 4, circumferential groove 34 and reservoir 30 include a plurality of coating material inlet and return flow ports to insure proper circulation of the coating material. In the illustrated embodiment, a pair of inlet ports 48 and a pair of return ports 50 are provided in groove 34; additional return ports 52 are provided in reservoir 30. If, as in some embodiments, the prewetting effect and extra control provided by applicator ring 26 is not required, the ring may be omitted. In such embodiments, both inlet and return ports must be provided in reservoir 30.

As schematically illustrated in FIG. 3, the coating material is initially provided in a supply tank 54 and is forced under pressure from the tank, through a coating material supply conduit 56 extending through arbor 16, and into circumferential groove 34 in ring 26 through the inlet ports 48 therein. A pump 58 provides the required pressure, typically one to five p.s.i. This pressure, in conjunction with the movement of the formed tube 12 as it moves axially away from forming arbor 16, causes the coating material to flow into and fill reservoir 30. As previously mentioned, groove 34 and reservoir 30 include return ports 50 and 52, respectively, through which the coating material is forced into coating material return conduits 60 and 62 and back to supply tank 54, thereby providing the desired continuous recirculation of the coating material. The various components of the coating apparatus may become quite warm when in use and cause some of the coating material to breakdown, or in the case of an organic material to partially polymerize, thereby forming undesirable lumps, fibers, or other impurities. Pump 58 therefore includes filtration means for removing any such impurities from the coating material as it is recirculated, thereby greatly increasing the purity, and hence, quality of the final coating.

The means for controlling the internal pressure of doctor 28 includes an air line 64 leading from a supply source (not shown) to the air lines 42 in hub 40, a regulator 66 for controlling the air flow from the source, and a bleeder system 68 for hydrostatically maintaining exactly the desired pressure. Typically, the internal pressure of doctor 28 will be maintained at a predetermined level between one and twenty p.s.i.

As shown in FIG. 3, facing plate 44 includes a plurality of axially-facing air ports 70 through which a high velocity air stream may be forced into the coated portion of tube 12 to increase the drying speed of the coating material by purging the vapors and other gases which may build up within the tube. The means for supplying this air includes a second air supply source (not shown) and an air supply conduit 72 extending from the supply source, through arbor 16, mounting member 32 and hub 40 and terminating in the cavity 74 formed between facing plate 44 and hub 40. A system of regulators (not shown) is provided to insure that the air streams flowing from cavity 74 through ports 70 and into tube 12 have sufficient velocity and quantity to purge the gases from the interior of the coated tube. This drying air may be preheated, if desired, by air preheating means 80 to increase the speed of drying of the coating material.

Other embodiments within the scope of the following claims will occur to those skilled in the art.

I claim:
1. Apparatus for mounting on the free end of an arbor for placing a uniform coating on the interior peripheral surface of a tube after said tube is formed by wrapping sheet material about said arbor, said apparatus comprising, in combination:
an applicator adapted for mounting coaxially with and engaging said free and of said arbor, said applicator including a pair of radially-extending axially-spaced portions defining a circumferential coating reservoir;
an adjustable doctor element spaced axially from said applicator on the side thereof most distant from said arbor providing an overflow reservoir intermediate said doctor element and said applicator;
coating material supply means;
coating material supply conduit means extending through said arbor from said coating material supply means to a coating material inlet port in said coating reservoir;
coating material return conduit means extending through said arbor from a coating material return port in said overflow reservoir to said coating material supply means;
coating material circulating means for circulating coating material through said coating material supply conduit means, said coating and overflow reservoirs, and said coating material return conduit means and maintaining a supply of said coating material within said coating reservoir in contact with the interior surface of said tube surrounding said coating apparatus; and
air supply means including air supply conduit means extending through said arbor beyond said doctor element,
said doctor element wiping said interior surface of said tube as said tube passes therebeyond providing said uniform coating and said air supply means supplying a stream of drying air to the interior of said coated tube beyond said doctor element for flow of said drying air within said tube to dry said coating and including means for preheating said drying air.

2. Apparatus for mounting on the free end of a stationary arbor for placing a uniform coating on the interior peripheral surface of a tube after said tube is formed by wrapping sheet material about said arbor, said apparatus comprising, in combination:
a circumferentially grooved applicator ring adapted for mounting coaxially with and engaging said free end of said arbor, the circumferential groove of said ring being defined by a pair of radially-extending flanges, the one of said flanges most distant from said arbor having a diameter substantially less than the inside diameter of said tube;
an adjustable doctor element spaced axially from said ring on the side thereof most distant from said arbor providing a reservoir intermediate said doctor element and said ring;
coating material supply means;
coating material supply conduit means extending through said arbor from said coating material supply means to a coating material inlet port in said groove;
coating material return conduit means extending through said arbor from a coating material return port in said reservoir to said coating material supply means;
coating material circulating means for circulating coating material through said coating material supply conduit means, said groove and said reservoir, and said coating material return conduit means and maintaining a supply of said coating material within said groove and said reservoir in contact with the interior surface of said tube surrounding said coating apparatus; and
air supply means including air supply conduit means extending through said arbor beyond said doctor element,
said doctor element wiping said interior surface of said tube as said tube passes therebeyond providing said uniform coating and said air supply means supplying a stream of drying air to the interior of said coated tube beyond said doctor element for flow of said drying air within said tube to dry said coating and including means for preheating said drying air.

3. Apparatus for mounting on the free end of an arbor for placing a uniform coating on the interior peripheral surface of a tube after said tube is formed by wrapping sheet material about said arbor, said apparatus comprising, in combination:

a circumferentially grooved applicator ring adapted for mounting coaxially with and engaging said free end of said arbor, the circumferential groove of said ring being defined by a pair of axially-spaced, radially-extending flanges, the one of said flanges most distant from said arbor having a diameter substantially less than the inside diameter of said tube;

doctor means including an inflatable doctor element spaced axially from said ring on the side thereof most distant from said arbor providing a reservoir intermediate said doctor element and said ring and means for varying the internal pressure of said doctor element to control the thickness of said uniform coating;

coating material supply means including:
  coating material supply conduit means extending through said arbor from a coating material supply source to a coating material inlet port in said groove,
  coating material return conduit means extending through said arbor from a coating material return port in said reservoir,
  coating material circulating means for circulating said coating material through said coating material supply conduit means, said groove and said reservoir, and said coating material return conduit means, and
  coating material filtration means for filtering said coating material during the circulation thereof; and air supply means supplying a stream of drying air to said tube including air supply conduit means extending through said arbor beyond said doctor element and means for preheating said drying air, said coating material supply means maintaining a supply of said coating material within said groove and said reservoir in contact with said interior surface of said tube surrounding said coating apparatus, said doctor element wiping said interior surface of tube as said tube passes therebeyond providing said uniform coating, and said air supply means supplying a stream of said drying air to said interior of said coated tube beyond said doctor element for flow of said drying air within said tube to dry said coating.

References Cited

UNITED STATES PATENTS

| | | | |
|---|---|---|---|
| 1,047,946 | 12/1912 | Jenkins | 93—80 |
| 1,613,119 | 1/1927 | Nelson | 93—80 |
| 3,007,438 | 11/1961 | Lancucki et al. | 118—306 X |
| 3,028,266 | 4/1962 | Larsh | 118—408 X |
| 3,111,431 | 11/1963 | Weaver | 118—408 X |
| 3,135,629 | 6/1964 | McLean | 118—408 |

FOREIGN PATENTS 536,602   1/1957   Canada.

WAYNE A. MORSE, JR., *Primary Examiner.*

WILLIAM W. DYER, JR., *Assistant Examiner.*